US 11,885,349 B1

(12) United States Patent
Ivankovic (10) Patent No.: US 11,885,349 B1
(45) Date of Patent: Jan. 30, 2024

(54) COMPRESSOR HAVING A DUAL-IMPELLER

(71) Applicant: PRATT & WHITNEY CANADA CORP., Longueuil (CA)

(72) Inventor: Milos Ivankovic, Toronto (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/820,607

(22) Filed: Aug. 18, 2022

(51) Int. Cl.
*F04D 29/44* (2006.01)
*F04D 29/42* (2006.01)
*F04D 17/10* (2006.01)
*F04D 29/28* (2006.01)

(52) U.S. Cl.
CPC ......... *F04D 29/441* (2013.01); *F04D 17/105* (2013.01); *F04D 29/285* (2013.01); *F04D 29/4213* (2013.01)

(58) Field of Classification Search
CPC .. F04D 17/105; F04D 29/285; F04D 29/4213; F04D 29/441
See application file for complete search history.

(56) References Cited

U.S. PATENT DOCUMENTS

| | | | |
|---|---|---|---|
| 3,625,003 A * | 12/1971 | Liddle et al. ........... | F02C 7/057 415/157 |
| 6,062,028 A * | 5/2000 | Arnold ................ | F04D 29/4206 417/407 |
| 6,834,501 B1 | 12/2004 | Vrbas et al. | |
| 7,014,418 B1 * | 3/2006 | Arnold .................... | F01D 5/048 415/206 |
| 7,407,364 B2 | 8/2008 | Arnold et al. | |
| 10,570,925 B2 * | 2/2020 | Duong ................. | F04D 29/441 |
| 10,830,144 B2 * | 11/2020 | Lambert .................. | F02C 7/16 |
| 2006/0198727 A1 * | 9/2006 | Arnold ................. | F02B 37/013 415/169.1 |
| 2018/0119708 A1 * | 5/2018 | Kares ...................... | F02B 37/00 |
| 2018/0306203 A1 * | 10/2018 | Nasir ..................... | F01D 9/045 |

FOREIGN PATENT DOCUMENTS

| RU | 2110700 C1 | 5/1998 |
|---|---|---|
| WO | 2012124293 A1 | 9/2012 |

* cited by examiner

*Primary Examiner* — Justin D Seabe
*Assistant Examiner* — Aye S Htay
(74) *Attorney, Agent, or Firm* — NORTON ROSE FULBRIGHT CANADA LLP.

(57) ABSTRACT

A compressor for an aircraft engine, has: a dual-impeller having: a first impeller having a first inlet and a first outlet located radially outwardly of the first inlet, and a second impeller rotatable with the first impeller, the second impeller having a second inlet and a second outlet located radially outwardly of the second inlet, the first inlet and the second inlet facing opposite axial directions; and first conduits having first conduit inlets and first conduit outlets, the first conduit inlets fluidly connected to the first outlet of the first impeller, the first conduit outlets fluidly connected to the second inlet of the second impeller; and second conduits having second conduits inlets fluidly connected to the second outlet of the second impeller, a second conduit of the second conduits disposed circumferentially between two adjacent first conduits of the first conduits.

19 Claims, 6 Drawing Sheets

COMPRESSOR HAVING A DUAL-IMPELLER

TECHNICAL FIELD

The application relates generally to aircraft engines and, more particularly, to compressors used in such engines.

BACKGROUND OF THE ART

An aircraft engine uses a compressor to compress an airflow before feeding said airflow to a combustor. Some compressors use axial compressors followed by a centrifugal compressor. These centrifugal compressors are subjected to thermal gradients and hoop stresses. Improvements are therefore sought.

SUMMARY

In one aspect, there is provided a compressor for an aircraft engine, comprising: a dual-impeller rotatable about a central axis, the dual-impeller having: a first impeller having a first inlet and a first outlet located radially outwardly of the first inlet relative to the central axis, and a second impeller rotatable with the first impeller, the second impeller having a second inlet and a second outlet located radially outwardly of the second inlet relative to the central axis, the first inlet and the second inlet facing opposite axial directions relative to the central axis; and first conduits circumferentially distributed around the central axis, the first conduits having first conduit inlets and first conduit outlets, the first conduit inlets fluidly connected to the first outlet of the first impeller, the first conduit outlets fluidly connected to the second inlet of the second impeller; and second conduits circumferentially distributed around the central axis, the second conduits having second conduits inlets, the second conduit inlets fluidly connected to the second outlet of the second impeller, a second conduit of the second conduits disposed circumferentially between two adjacent first conduits of the first conduits.

The compressor described above may include any of the following features, in any combinations.

In some embodiments, the first conduits and the second conduits are circumferentially interspaced to form a circumferentially intertwined array of the first conduits and the second conduits.

In some embodiments, the first conduits are first diffuser pipes and the second conduits are second diffuser pipes.

In some embodiments, the first outlet and the second outlet are located radially outwardly of the first inlet and the second inlet.

In some embodiments, the first impeller has first blades circumferentially distributed about the central axis and the second impeller has second blades circumferentially distributed about the central axis, the first blades and the second blades extending a circumferential direction opposite a direction of rotation of the dual-impeller.

In some embodiments, the first conduits extend from the first conduit inlets to apexes being axially offset from the first conduit inlets, and extend back towards the first impeller from the apexes to the first conduit outlets.

In some embodiments, the first impeller and the second impeller are parts of a single monolithic body.

In some embodiments, the first impeller and the second impeller are disposed back-to-back, and wherein the dual-impeller is free of a gap between the first impeller and the second impeller.

In some embodiments, the dual-impeller has a hub defining a first gaspath face and a second gaspath face opposite the first gaspath face, the first gaspath face extending from the first inlet to the first outlet, the second gaspath face extending from the second inlet to the second outlet, the first impeller having first blades protruding from the first gaspath face and second blades protruding from the second gaspath face In another aspect, there is provided a compressor for an aircraft engine, comprising: a dual-impeller rotatable about a central axis, the dual-impeller having a first impeller having a first inlet and a first outlet located radially outwardly of the first inlet relative to the central axis, and a second impeller secured to the first impeller, the second impeller having a second inlet and a second outlet located radially outwardly of the second inlet relative to the central axis, the first inlet and the second inlet facing opposite axial directions relative to the central axis; and first conduits having first conduit inlets and first conduit outlets, the first conduit inlets fluidly connected to the first outlet of the first impeller, the first conduit outlets fluidly connected to the second inlet of the second impeller, wherein the first impeller and the second impeller are parts of a monolithic body.

The compressor may include any of the following features, in any combinations.

In some embodiments, the dual-impeller is free of a gap between the first impeller and the second impeller.

In some embodiments, the dual-impeller has a hub defining a first gaspath face and a second gaspath face opposite the first gaspath face, the first gaspath face extending from the first inlet to the first outlet, the second gaspath face extending from the second inlet to the second outlet, the first impeller having first blades protruding from the first gaspath face and second blades protruding from the second gaspath face.

In some embodiments, second conduits have second conduits inlets and second conduit outlets, the second conduit inlets fluidly connected to the second outlet of the second impeller, a second conduit of the second conduits disposed circumferentially between two adjacent first conduits of the first conduits.

In some embodiments, the first conduits are first diffuser pipes and the second conduits are second diffuser pipes.

In some embodiments, the first conduits extend from the first conduit inlets to apexes being axially offset from the first conduit inlets, and extend back towards the first impeller from the apexes to the first conduit outlets.

In some embodiments, the first impeller has first blades circumferentially distributed about the central axis and the second impeller has second blades circumferentially distributed about the central axis, the first blades and the second blades extending a circumferential direction opposite a direction of rotation of the dual-impeller.

In yet another aspect, there is provided an aircraft engine, comprising: a compressor having: a dual-impeller rotatable about a central axis, the dual-impeller having a first impeller having a first inlet and a first outlet located radially outwardly of the first inlet relative to the central axis, and a second impeller secured to the first impeller, the second impeller having a second inlet and a second outlet located radially outwardly of the second inlet relative to the central axis, the first inlet and the second inlet facing opposite axial directions relative to the central axis; and first conduits having first conduit inlets and first conduit outlets, the first conduit inlets fluidly connected to the first outlet of the first impeller, the first conduit outlets fluidly connected to the second inlet of the second impeller; and second conduits having second conduits inlets and second conduit outlets, the second conduit inlets fluidly connected to the second outlet of the second impeller, the first conduits interspersed among the second conduits in a circumferential direction around the central axis.

The aircraft engine described above may include any of the following features, in any combinations.

In some embodiments, the first impeller and the second impeller are parts of a monolithic body.

In some embodiments, the dual-impeller has a hub defining a first gaspath face and a second gaspath face opposite the first gaspath face, the first gaspath face extending from the first inlet to the first outlet, the second gaspath face extending from the second inlet to the second outlet, the first impeller having first blades protruding from the first gaspath face and second blades protruding from the second gaspath face.

In some embodiments, the first outlet is directly fluidly connected to the first conduit inlets, the second outlet being directly fluidly connected to the second conduit inlets.

DESCRIPTION OF THE DRAWINGS

Reference is now made to the accompanying figures in which.

DETAILED DESCRIPTION

Figure 1:
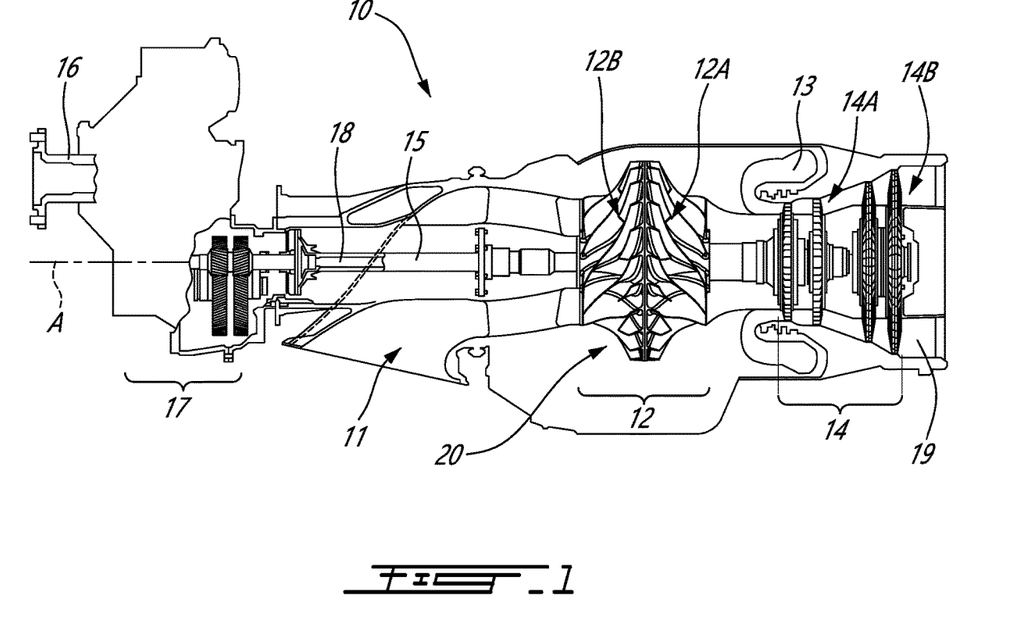
FIG. 1 is a schematic cross sectional view of an aircraft engine depicted as a gas turbine engine.

FIG. 1 illustrates an aircraft engine depicted as a gas turbine engine 10 of a type preferably provided for use in subsonic flight, generally comprising in serial flow communication an inlet 11 for receiving air, a compressor 12 for compressing the air received via the inlet 11, a combustor 13 for mixing fuel with the compressed air and for generating an annular stream of combustion gases. A turbine section 14 receives the combustion gases from the combustor 13. The turbine section 14 has a high-pressure turbine 14A drivingly engaged to the compressor 12 via a high-pressure shaft 15. The turbine section 14 further has a power or low-pressure turbine 14B downstream of the high-pressure turbine 14A and drivingly engaged to a an output shaft 16 via a gearbox 17 and via a low-pressure shaft 18, which may be concentric with the high-pressure shaft 15. The gas turbine engine 10 has an exhaust 19 for expelling the combustion gases. Although the depicted gas turbine engine 10 is a turboshaft engine, the present disclosure may apply to other engines, such as turboprop engines, turbofan engines, and to auxiliary power units (APU). The compressor 12 and the turbine section 14 are rotatable about a central axis A of the gas turbine engine 10.

The compressor 12 includes a high-pressure compressor 12A drivingly engaged to the high-pressure turbine 14A via the high-pressure shaft 15. The compressor 12 has a low-pressure compressor 12B upstream of the high-pressure compressor 12A and drivingly engaged to the high-pressure turbine 14A via the high-pressure shaft 15. In an alternate embodiment, the compressor 12 may be engaged to the low-pressure shaft 18.

Figure 2:
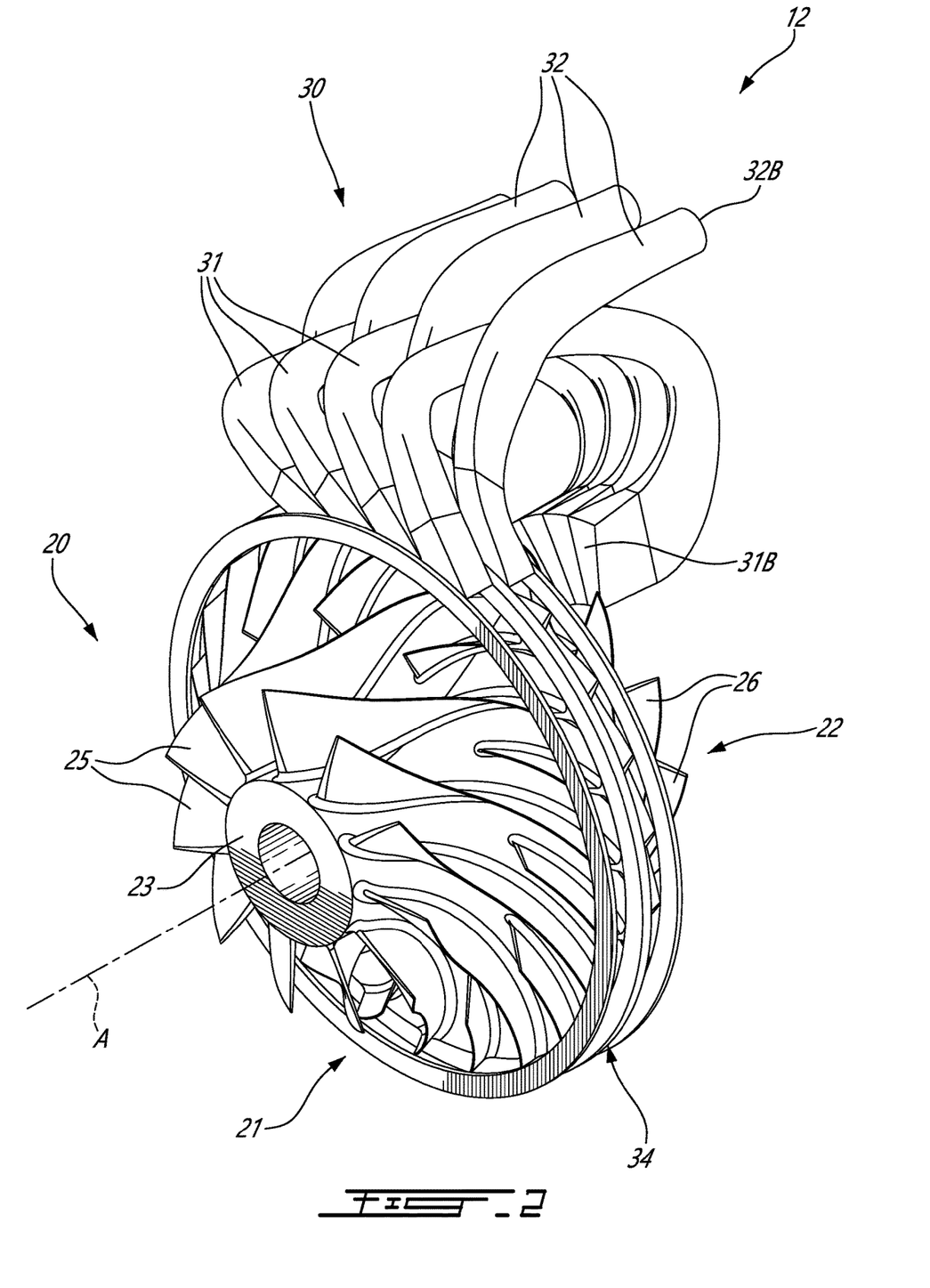
FIG. 2 is a front three dimensional view of a compressor of the gas turbine engine of FIG. 1.
Figure 3:
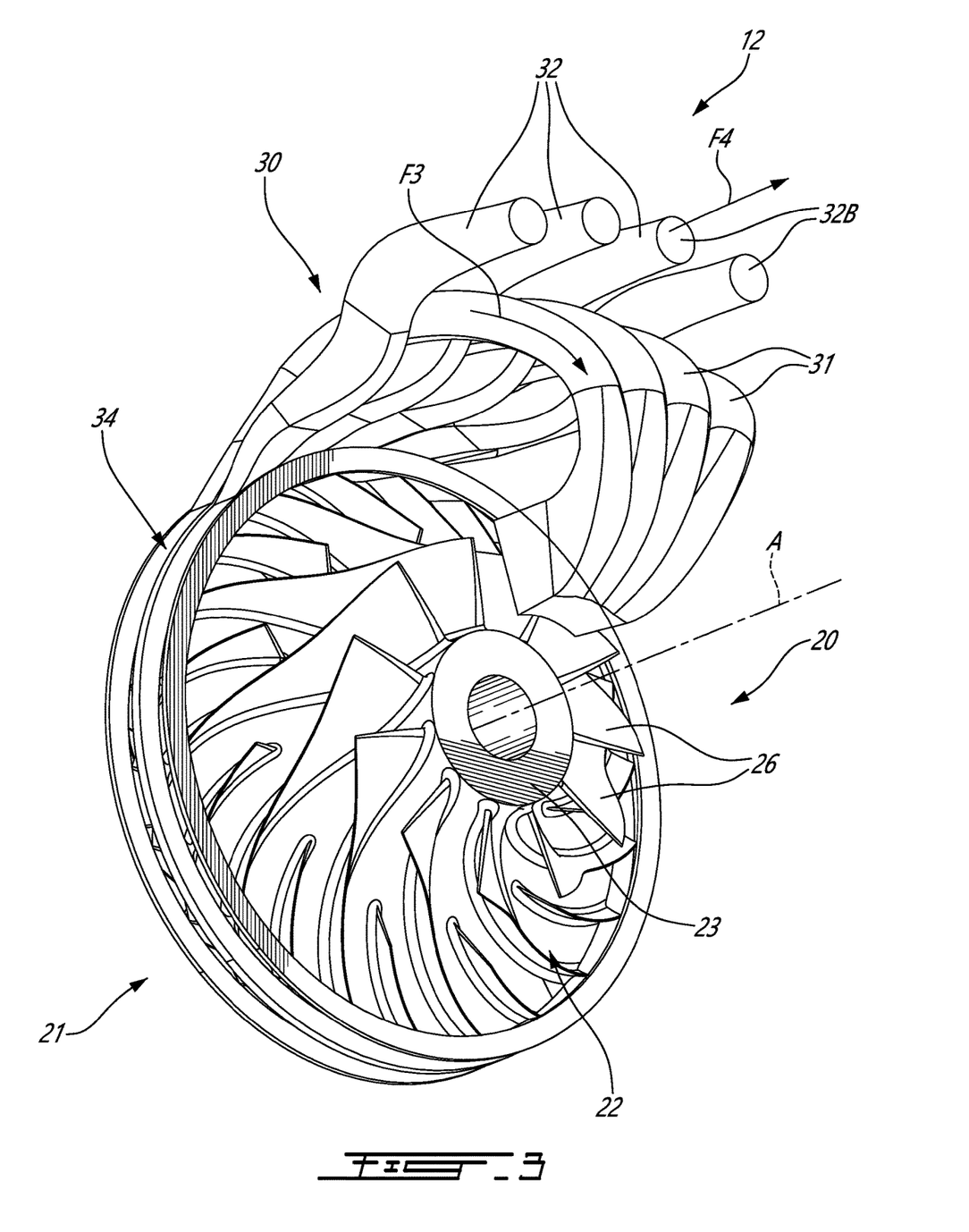
FIG. 3 is a rear three dimensional view of the compressor of the gas turbine engine of FIG. 1.

Referring now to FIGS. 2-3, in the present embodiment, the compressor 12 includes a dual-impeller 20 rotatable about the central axis A. The dual-impeller 20 includes a first impeller 21 and a second impeller 22. The first impeller 21 and the second impeller 22 are secured to one another such that they rotate together at the same rotational speed. The first impeller 21 corresponds to the low-pressure compressor 12B and the second impeller 22 corresponds to the high-pressure compressor 12A. The first and second impellers 21, 22 are therefore driven by the same common shaft, herein, the high-pressure shaft 15.

The compressor 12 further includes a diffuser 30 that is used to fluidly connect together the first impeller 21 to the second impeller 22 and to fluidly connected the second impeller 22 to the combustor 13 to supply the compressed air to a combustion chamber of the combustor 13. The diffuser 30 includes first conduits 31 and second conduits 32. The first conduits 31 and the second conduits 32 may further act as diffuser pipes used to further increase a pressure of air flowing there through and to reduce a speed of said air. More detail about the diffuser 30 are presented below.

Figure 4:
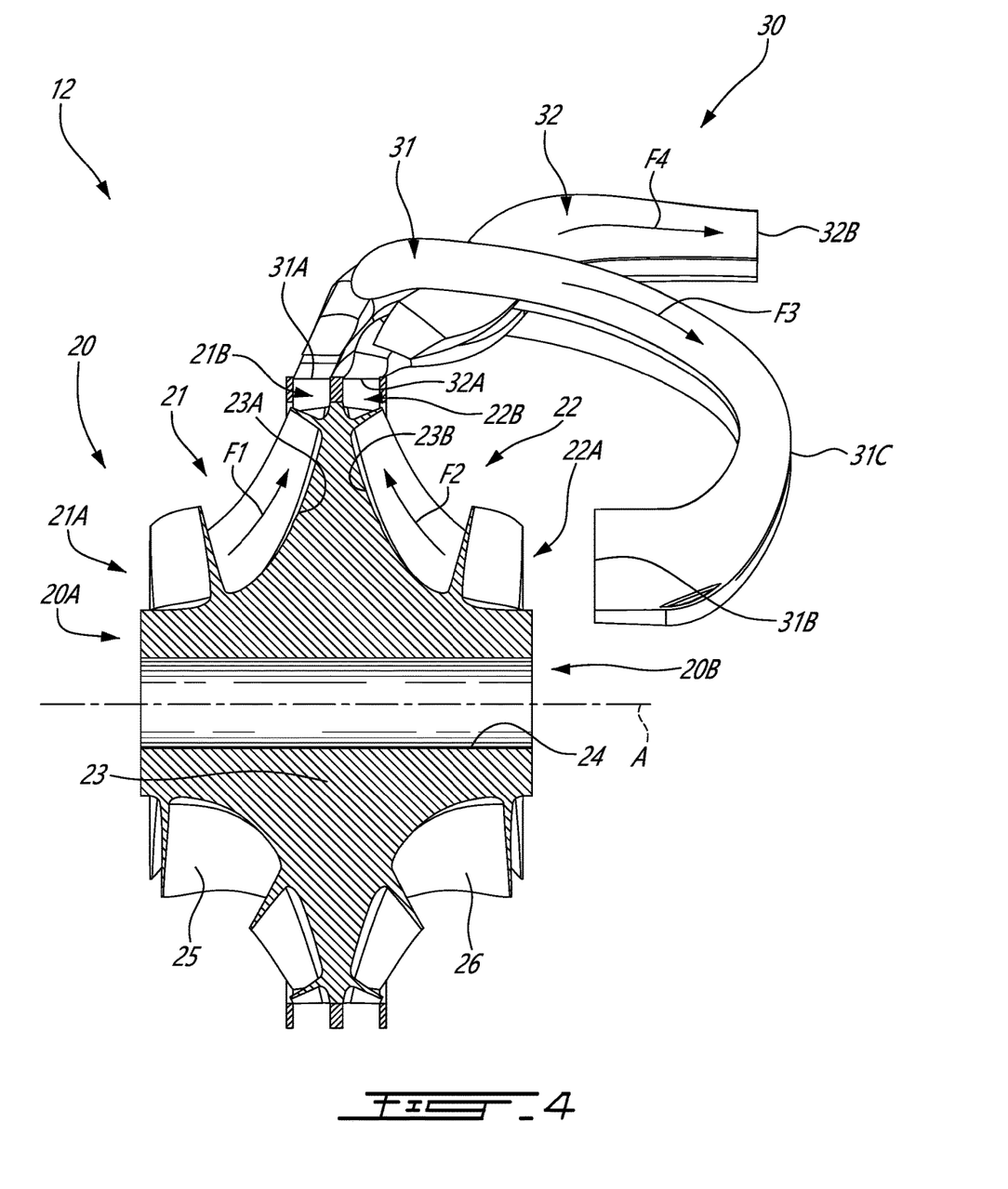
FIG. 4 is a cross-sectional view of the compressor of the gas turbine engine of FIG. 1.

Referring now to FIG. 4, the compressor 12 is shown in cross-section taken on a plane containing the central axis A. The dual-impeller 20 has a first side 20A and a second side 20B opposed to the first side 20A. The first side 20A and the second side 20B face opposite axial directions relative to the central axis A. In other words, the first side 20A faces a forward direction whereas the second side 20B faces a rearward direction. In the embodiment shown, the first impeller 21 has a first inlet 21A on the first side 20A of the dual-impeller 20 and a first outlet 21B. The first outlet 21B is located radially outwardly of the first inlet 21A relative to the central axis A. A first impeller flow F1 flowing within the first impeller 21 from the first inlet 21A to the first outlet 21B enters the first inlet 21A with a substantially axial direction relative to the central axis A and exits the first outlet 21B with a substantially radial direction relative to the central axis A. Herein, the expression "substantially" as in "substantially axial/radial" denotes that a main component of the direction of the flow is within the axial/radial orientation.

The second impeller 22 has a second inlet 22A on the second side 20B of the dual-impeller 20 and a second outlet 22B. Thus, the first inlet 21A and the second inlet 22A face opposite axial directions relative to the central axis A. The second outlet 22B is located radially outwardly of the second inlet 22A relative to the central axis A. A second impeller flow F2 flowing within the second impeller 22 from the second inlet 22A to the second outlet 22B enters the second inlet 22A with a substantially axial direction relative to the central axis A and exits the second outlet 22B with a substantially radial direction relative to the central axis A.

In the embodiment shown, the first impeller 21 and the second impeller 22 are parts of a single monolithic body, which may be made of titanium or any suitable material. The dual-impeller 20 has a hub 23 that extends circumferentially all around the central axis A. The hub 23 may define a bore 24 sized to receive a shaft (e.g., high-pressure shaft 15) of the gas turbine engine 10. The hub 23 has a first gaspath face 23A and a second gaspath face 23B opposite the first gaspath face 23A. The first gaspath face 23A extends from the first inlet 21A to the first outlet 21B. The second gaspath face 23B extends from the second inlet 22A to the second outlet 22B. The first and second gaspath faces 23A, 23B extend radially outwardly and axially towards one another from the first and second inlets 21A, 21B towards the first and second outlets 22A, 22B.

The first impeller 21 has first blades 25 protruding from the first gaspath face 23A and second blades 26 protruding from the second gaspath face 23B. The first blades 25 monolithically protrude from the hub 23 and the second blades 26 monolithically protrude from the hub 23. Put differently, the hub 23, the first blades 25, and the second blades 26 are all parts of a single monolithic body. In the present embodiment, the first impeller 21 and the second impeller 22 are free of a gap therebetween. Thus, both of the first impeller 21 and the second impeller 22 are free of a back face. The first blades 25 and the second blades 26 may include full blades extending all the way from the first and second inlets 21A, 22A to the first and second outlets 21B, 22B and splitter blades that have shorter chords. The first blades 25 may exhibit different characteristics (e.g., chords, curvature, span, sweep, taper, twist, etc) than the second blades 26.

Typically, an impeller has a front face defining an inlet and a back face where an outlet is located; the back face is usually subjected to hoop stress, crack propagation, fatigue, thermal gradients and so on. The disclosed dual-impeller 20 is made by having an imaginary back face of the first impeller 21 coincident with an imaginary back face of the second impeller 22. Thus, the first and second impellers 21, 22 are free of a back face since they are monolithically secured to one another. This configuration may be simpler since there is fewer moving parts and bearings; may provide tighter tip clearances since the nodding of the impeller exducer area may be reduced; the tip clearance may be substantially constant between design and off-design conditions; may avoid concerns with back face since, may reduce stress and increase life; and the dual-impeller 20 may be more robust and stiff.

Figure 5:
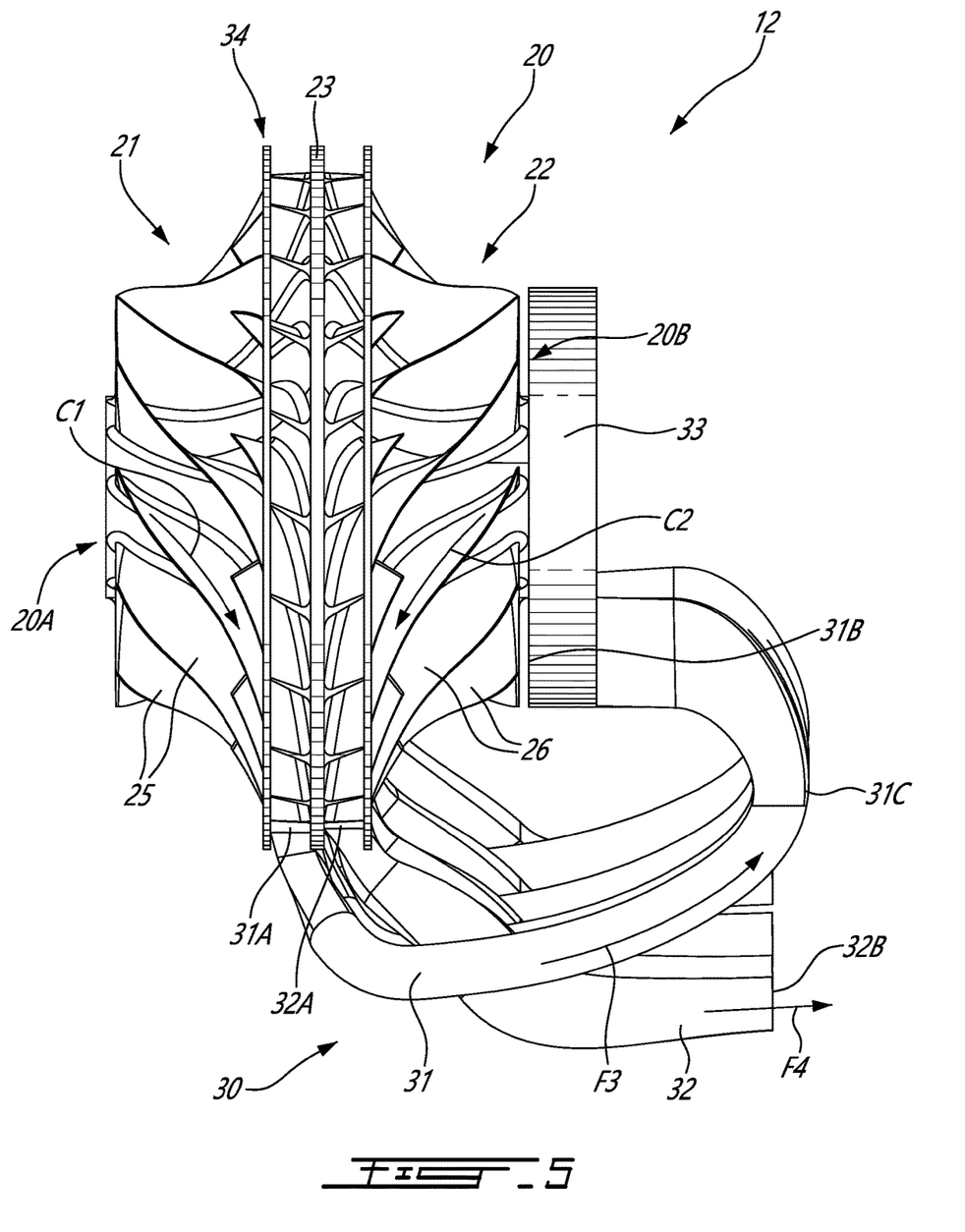
FIG. 5 is a top view of the compressor of the gas turbine engine of FIG. 1.

Referring now to FIG. 5, the first blades 25 wrap around the hub 23 in a first direction C1 and the second blades 26 wrap around the hub 23 in a second direction C2. The first direction C1 and the second direction C2 have a component in a circumferential direction relative to the central axis A. The circumferential component of the first and second directions C1, C2 are parallel to one another. That is, the first blades 25 extend around the hub 23 in the same circumferential orientation as the second blades 26. Put differently, when looking at the dual-impeller 20 along a line of sight being parallel to the central axis A and looking at the first side 20A, the first blades 25 and the second blades 26 extend in a clockwise direction. When looking at the first side 20A of the dual-impeller 20 along the line of sight, the first blades 25 extend in the clockwise direction whereas, while looking at the second side 20B of the dual-impeller 20, the second blades 26 extend in a counter clockwise direction.

Referring back to FIG. 4, the diffuser 30 is described in more detail. The first conduits 31 fluidly connect the first outlet 21B to the second inlet 22A. The second conduits 32 fluidly connect the second outlet 22B to the combustor 13 (FIG. 1). The first conduits 31 and the second conduits 32 are interwoven. Stated differently, a second conduit 32 of the second conduits 32 is disposed circumferentially between two adjacent first conduits 31 of the first conduits 31. This configuration is better illustrated by looking at FIGS. 2-3.

The first conduits 31 have first conduit inlets 31A fluidly connected to the first outlet 21B and first conduit outlets 31B fluidly connected to the first conduit inlets 31A and to the second inlet 22A. In the embodiment shown, the first conduits 31 extend from the first conduit inlets 31A to apexes 31C being axially offset from the first conduit inlets 31A, and extend back towards the first impeller 21 from the apexes 31C to the first conduit outlets 31B. Stated differently, the first conduits 31 are C-shaped such that a first conduit flow F3 extend away from the dual-impeller 20 and curve to revert back to flow toward the dual-impeller 20 to reach the second inlet 22A of the second impeller 22. The second conduits 32 extend from second conduit inlets 32A fluidly connected to the second outlets 22B to second conduit outlets 32B fluidly connected to the second conduit inlets 32A and to the combustor 13 (FIG. 1). A second conduit flow F4 within the second conduits 32 is re-oriented from being substantially radial at the second conduit inlets 32A to being substantially axial at the second conduit outlets 32B.

Referring to FIG. 5, in the present embodiment, a support member 33, such as a ring, may be used to structurally interconnect together ends of the second conduits 32 that define the first conduit outlets 31B. This support member 33 may be secured to a case or other static structure of the gas turbine engine 10. A similar support member 34 may be used to secure ends of the first conduits 31 that define the first conduit inlets 31A and to secure ends of the second conduits 32 that define the second conduit inlets 32A. This similar support member 34 may include two rings extending around the dual-impeller 20 and secured to a static structure (e.g., casing) of the gas turbine engine 10.

In the embodiment shown, the use of the first and second conduits 31, 32, which act as diffuser pipes, may avoid the use of a plenum or volute or manifold. In some cases, centrifugal compressor use a volute or plenum or manifold that extends circumferentially all around the central axis A for receiving air outputted by the compressor. The volume or plenum or manifold discharges the air it contains via suitable piping. In the present embodiment, the dual-impeller is free of a volute/plenum/manifold such that air that exits the first impeller 21 and that exits the second impeller 22 is directly flown within the first and second conduits 31, 32. Stated differently, the first outlet 21B of the first impeller 21 is directly fluidly connected to the first conduit inlets 31A and the second outlet 22B of the second impeller 22 is directly fluidly connected to the second conduit inlets 32A. This may improve aerodynamic efficiency of the compressor 12 compared to a configuration having such a volute/plenum/manifold.

Figure 6:
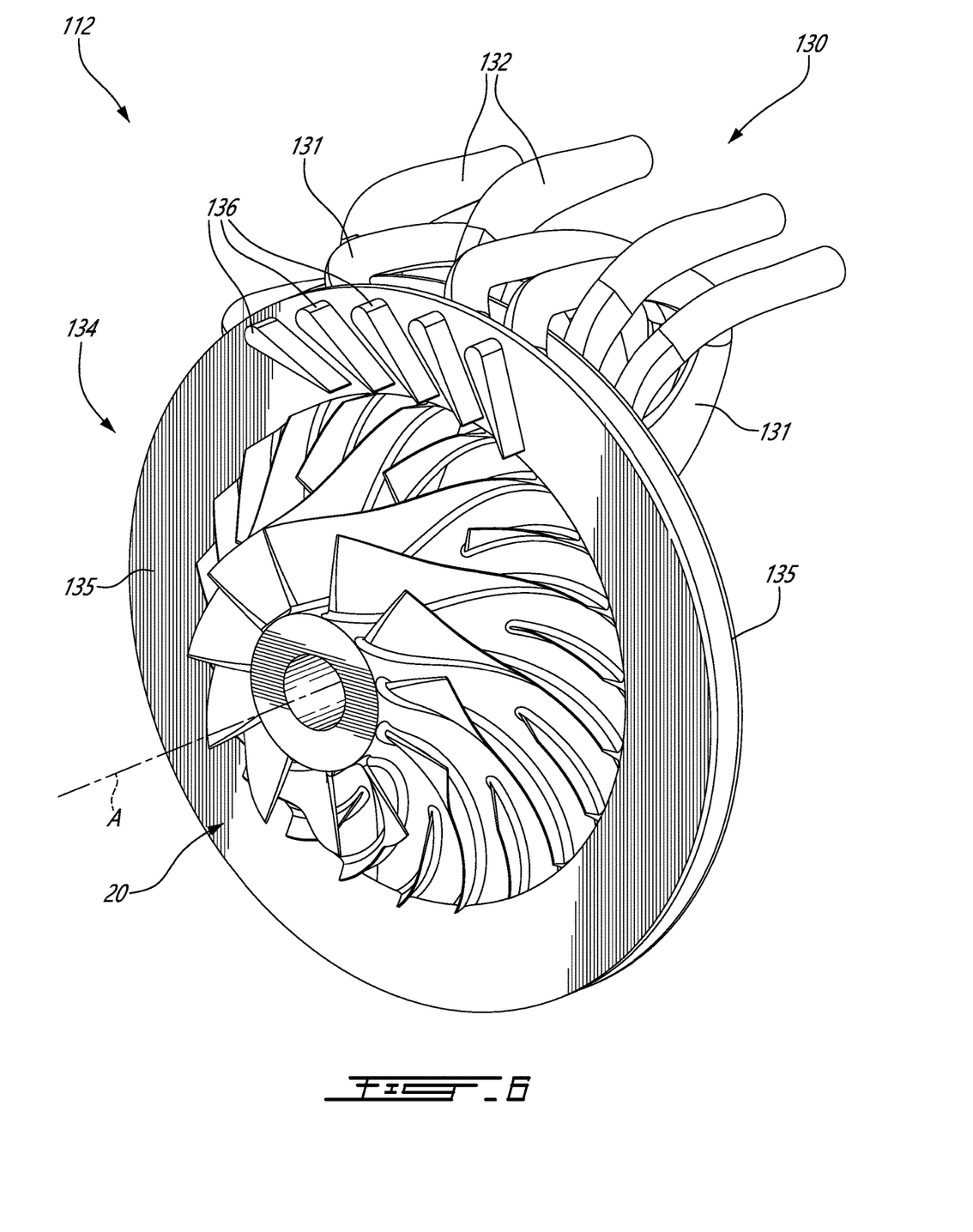
FIG. 6 is front three dimensional view of a compressor in accordance with another embodiment.

Referring now to FIG. 6, another embodiment of a compressor is shown at 112. For the sake of conciseness, only elements differing from the compressor 12 described above are described herein below.

In the embodiment shown, the compressor 112 includes the dual-impeller 20 and a diffuser 130. The diffuser 130 includes first conduits 131 and second conduits 132 as described above. The diffuser 130 includes a vane diffuser 134 that includes three axially-spaced apart annular members 135; one of them being removed for illustration purposes. The vane diffuser 134 further includes first vanes 136 located axially between a first pair of the three annular members 135 and second vanes (not shown) located axially between a second pair of the three annular members 135. The first vanes 136 and the second vanes are circumferentially distributed about the central axis A. The first and second vanes are used to re-orient the airflow exiting the first and second impellers 21, 22, to further increase the pressure, and to reduce the speed of the airflow.

It will be appreciated that the principles of the present disclosure may be used for a turbine section. For instance the dual-impeller 20 may be used as part of the turbine section 14 of the gas turbine engine 10.

In some embodiments, the first conduits 31, 131 and/or the second conduits 32, 132 may exhibit a reduced width taken in a circumferential direction relative to the central axis A to be able to allow sufficient circumferential space to receive the second conduits 32, 132 and/or the first conduits 31, 131. However, to avoid creating a local reduction in the cross-sectional area (e.g., throat), a height taken in a radial direction relative to the central axis A may be increased to maintain a substantially constant cross-sectional area where the first conduits and the second conduits are interwoven.

The disclosed dual-impeller may require less axial space, thereby reducing an overall axial length of the gas turbine engine 10; it may require less bearing than a classical configuration having two impellers spaced apart from one another; it may reduce the impeller "nodding" phenomenon; it may improve the tip clearance; it may be more stiff thereby improving its life; and it may avoid thermal gradient issues typically present at back faces of classical impellers.

It will be appreciated that the dual-impeller 20 and the diffuser 30 may be used in other applications than within a gas turbine engine. For instance, the dual-impeller and diffuser 20, 30 may be used to supply compressed air to an internal combustion engine, such as a rotary engine. The rotary engine may be part of a turbo-compounded engine assembly in which the rotary engine drives a load and in which a turbine driven by exhaust gases of the rotary engine is used to drive the dual-impeller 20 and to drive the load with the rotary engine.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A compressor for an aircraft engine, comprising:
a dual-impeller rotatable about a central axis, the dual-impeller having:
a first impeller having a first inlet and a first outlet located radially outwardly of the first inlet relative to the central axis, and
a second impeller rotatable with the first impeller, the second impeller having a second inlet and a second outlet located radially outwardly of the second inlet relative to the central axis, the first inlet and the second inlet facing opposite axial directions relative to the central axis; and
first conduits circumferentially distributed around the central axis, the first conduits having first conduit inlets and first conduit outlets, the first conduit inlets fluidly connected to the first outlet of the first impeller, the first conduit outlets fluidly connected to the second inlet of the second impeller; and
second conduits circumferentially distributed around the central axis, the second conduits having second conduits inlets, the second conduit inlets fluidly connected to the second outlet of the second impeller, a second conduit of the second conduits disposed circumferentially between two adjacent first conduits of the first conduits.

2. The compressor of claim 1, wherein the first conduits and the second conduits are circumferentially interspaced to form a circumferentially intertwined array of the first conduits and the second conduits.

3. The compressor of claim 2, wherein the first conduits are first diffuser pipes and the second conduits are second diffuser pipes.

4. The compressor of claim 1, wherein the first outlet and the second outlet are located radially outwardly of the first inlet and the second inlet.

5. The compressor of claim 1, wherein the first impeller has first blades circumferentially distributed about the central axis and the second impeller has second blades circumferentially distributed about the central axis, the first blades and the second blades extending a circumferential direction opposite a direction of rotation of the dual-impeller.

6. The compressor of claim 1, wherein the first conduits extend from the first conduit inlets to apexes being axially offset from the first conduit inlets, and extend back towards the first impeller from the apexes to the first conduit outlets.

7. The compressor of claim 1, wherein the first impeller and the second impeller are parts of a single monolithic body.

8. The compressor of claim 7, wherein the first impeller and the second impeller are disposed back-to-back, and wherein the dual-impeller is free of a gap between the first impeller and the second impeller.

9. The compressor of claim 7, wherein the dual-impeller has a hub defining a first gaspath face and a second gaspath face opposite the first gaspath face, the first gaspath face extending from the first inlet to the first outlet, the second gaspath face extending from the second inlet to the second outlet, the first impeller having first blades protruding from the first gaspath face and second blades protruding from the second gaspath face.

10. A compressor for an aircraft engine, comprising:
a dual-impeller rotatable about a central axis, the dual-impeller having
a first impeller having a first inlet and a first outlet located radially outwardly of the first inlet relative to the central axis, and
a second impeller secured to the first impeller, the second impeller having a second inlet and a second outlet located radially outwardly of the second inlet relative to the central axis, the first inlet and the second inlet facing opposite axial directions relative to the central axis;
first conduits having first conduit inlets and first conduit outlets, the first conduit inlets fluidly connected to the first outlet of the first impeller, the first conduit outlets fluidly connected to the second inlet of the second impeller; and
second conduits circumferentially distributed around the central axis, the second conduits having second conduits inlets, the second conduit inlets fluidly connected to the second outlet of the second impeller, a second conduit of the second conduits disposed circumferentially between two adjacent first conduits of the first conduits,
wherein the first impeller and the second impeller are parts of a monolithic body.

11. The compressor of claim 10, wherein the dual-impeller is free of a gap between the first impeller and the second impeller.

12. The compressor of claim 10, wherein the dual-impeller has a hub defining a first gaspath face and a second gaspath face opposite the first gaspath face, the first gaspath face extending from the first inlet to the first outlet, the second gaspath face extending from the second inlet to the second outlet, the first impeller having first blades protruding from the first gaspath face and second blades protruding from the second gaspath face.

13. The compressor of claim 10, wherein the first conduits are first diffuser pipes and the second conduits are second diffuser pipes.

14. The compressor of claim 10, wherein the first conduits extend from the first conduit inlets to apexes being axially offset from the first conduit inlets, and extend back towards the first impeller from the apexes to the first conduit outlets.

15. The compressor of claim 10, wherein the first impeller has first blades circumferentially distributed about the central axis and the second impeller has second blades circumferentially distributed about the central axis, the first blades and the second blades extending a circumferential direction opposite a direction of rotation of the dual-impeller.

16. An aircraft engine, comprising:
a compressor having:
a dual-impeller rotatable about a central axis, the dual-impeller having
a first impeller having a first inlet and a first outlet located radially outwardly of the first inlet relative to the central axis, and
a second impeller secured to the first impeller, the second impeller having a second inlet and a second outlet located radially outwardly of the second inlet relative to the central axis, the first inlet and the second inlet facing opposite axial directions relative to the central axis; and
first conduits having first conduit inlets and first conduit outlets, the first conduit inlets fluidly connected to the first outlet of the first impeller, the first conduit outlets fluidly connected to the second inlet of the second impeller; and
second conduits having second conduits inlets and second conduit outlets, the second conduit inlets fluidly connected to the second outlet of the second impeller, the first conduits interspersed among the second conduits in a circumferential direction around the central axis.

17. The aircraft engine of claim 16, wherein the first impeller and the second impeller are parts of a monolithic body.

18. The aircraft engine of claim 17, wherein the dual-impeller has a hub defining a first gaspath face and a second gaspath face opposite the first gaspath face, the first gaspath face extending from the first inlet to the first outlet, the second gaspath face extending from the second inlet to the second outlet, the first impeller having first blades protruding from the first gaspath face and second blades protruding from the second gaspath face.

19. The aircraft engine of claim 16, wherein the first outlet is directly fluidly connected to the first conduit inlets, the second outlet being directly fluidly connected to the second conduit inlets.

* * * * *